United States Patent
Larson

(10) Patent No.: US 8,035,665 B2
(45) Date of Patent: Oct. 11, 2011

(54) METHODS AND SYSTEMS FOR USING CONTROL DATA TO CONTROL A DISPLAY OF AN IMAGE BY A DISPLAY DEVICE

(75) Inventor: Arnold W. Larson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1962 days.

(21) Appl. No.: 11/066,891

(22) Filed: Feb. 25, 2005

(65) Prior Publication Data

US 2006/0192794 A1    Aug. 31, 2006

(51) Int. Cl.
*G09G 5/02* (2006.01)

(52) U.S. Cl. ........................................ 345/698

(58) Field of Classification Search ............... 345/204, 345/696, 698, 699, 214, 215; 380/20
See application file for complete search history.

(56) References Cited

U.S. PATENT DOCUMENTS

| | | | |
|---|---|---|---|
| 5,351,129 A * | 9/1994 | Lai | 348/584 |
| 5,420,604 A | 5/1995 | Scheffer et al. | |
| 5,543,849 A * | 8/1996 | Long | 348/460 |
| 5,652,845 A | 7/1997 | Arai et al. | |
| 5,729,296 A | 3/1998 | Rhodes | |
| 5,887,147 A | 3/1999 | Arai et al. | |
| 5,909,592 A | 6/1999 | Shipman | |
| 6,247,090 B1 | 6/2001 | Arai et al. | |
| 6,388,715 B1 * | 5/2002 | Eggen et al. | 348/569 |
| 6,513,088 B2 | 1/2003 | Arai et al. | |
| 6,549,970 B2 | 4/2003 | Arai et al. | |
| 6,618,117 B2 | 9/2003 | Silverbrook | |
| 6,798,420 B1 | 9/2004 | Xie | |
| 2002/0112250 A1 * | 8/2002 | Koplar et al. | 725/153 |
| 2003/0149879 A1 * | 8/2003 | Tian et al. | 713/176 |
| 2003/0214507 A1 * | 11/2003 | Mawatari et al. | 345/530 |
| 2004/0056864 A1 | 3/2004 | Valmiki et al. | |
| 2004/0247121 A1 * | 12/2004 | Lee et al. | 380/205 |

* cited by examiner

*Primary Examiner* — Kevin Nguyen
*Assistant Examiner* — Dennis Joseph

(57) ABSTRACT

Methods of using control data to control a display of an image by a display device include encoding the control data as a line of video data, including the line of encoded control data in a video signal having a number of lines of image video data, transmitting the video signal to the display device, and using the control data to process the video signal and display the image.

33 Claims, 5 Drawing Sheets

METHODS AND SYSTEMS FOR USING CONTROL DATA TO CONTROL A DISPLAY OF AN IMAGE BY A DISPLAY DEVICE

BACKGROUND

The advent of computers, interactive electronic communication, the Internet, and other advances in the digital realm of consumer electronics have resulted in a great variety of display options for users of electronic devices such as personal computers, televisions, and digital projector systems. For example, various electronic images may be displayed by personal computer screens, television screens, projector screens, and other electronic display devices that are driven by a video signal source. An exemplary video signal source is a video graphics card.

It is often desirable for a single display device to be able to display an image in different display positions, sizes, and resolutions. Accordingly, the display device has to be capable of receiving and processing a variety of different video signals comprising video data corresponding to an image to be displayed. However, conventional video signal sources are not configured to include control data in a video signal specifying a particular frequency of the video signal, phase of the video signal, resolution of the image to be displayed, or other characteristic that corresponds to the video signal. Likewise, conventional display devices are not configured to process and decode such control data.

Consequently, display devices currently depend on the existence of characteristic data included in the video data itself to determine the display characteristics of a particular image that is to be displayed. The absence of control data in a video signal specific to the particular video signal often results in the misinterpretation of video data and degradation of video quality.

SUMMARY

Methods of using control data to control a display of an image by a display device include encoding the control data as a line of video data, including the line of encoded control data in a video signal having a number of lines of image video data, transmitting the video signal to the display device, and using the control data to process the video signal and display the image.

Systems for displaying an image defined by image video data include a video signal source configured to generate and transmit a video signal to a display device. The video signal includes a number of lines of the image video data and a line of control data that is encoded as video data. The display device is configured to use the control data to process the video signal and display the image defined by the image video data.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

Methods and systems for using control data to control the display of an image by a display device are described herein. A video signal source is configured to generate and transmit a video signal to the display device. The video signal includes a number of lines of image video data and one or more lines of control data encoded as video data. The display device is configured to decode and use the control data to process the video signal and display an image as defined by the image video data.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

As used herein and in the appended claims, unless otherwise specifically denoted, the term "video signal source" or "source" will be broadly understood to refer to any device that is configured to generate and/or transmit a video signal to a display device. The video signal source may include, but is not limited to, a video card, a computer, a television, a projector system, or the like. The term "display device" or "display" will be used herein and in the appended claims, unless otherwise specifically denoted, to broadly refer to any device configured to receive a video signal and generate and display an image corresponding to the received video signal. The display device may include, but is not limited to, a computer monitor or screen, a television monitor or screen, a liquid crystal display (LCD), a display device of a projector system, or the like.

Figure 1:
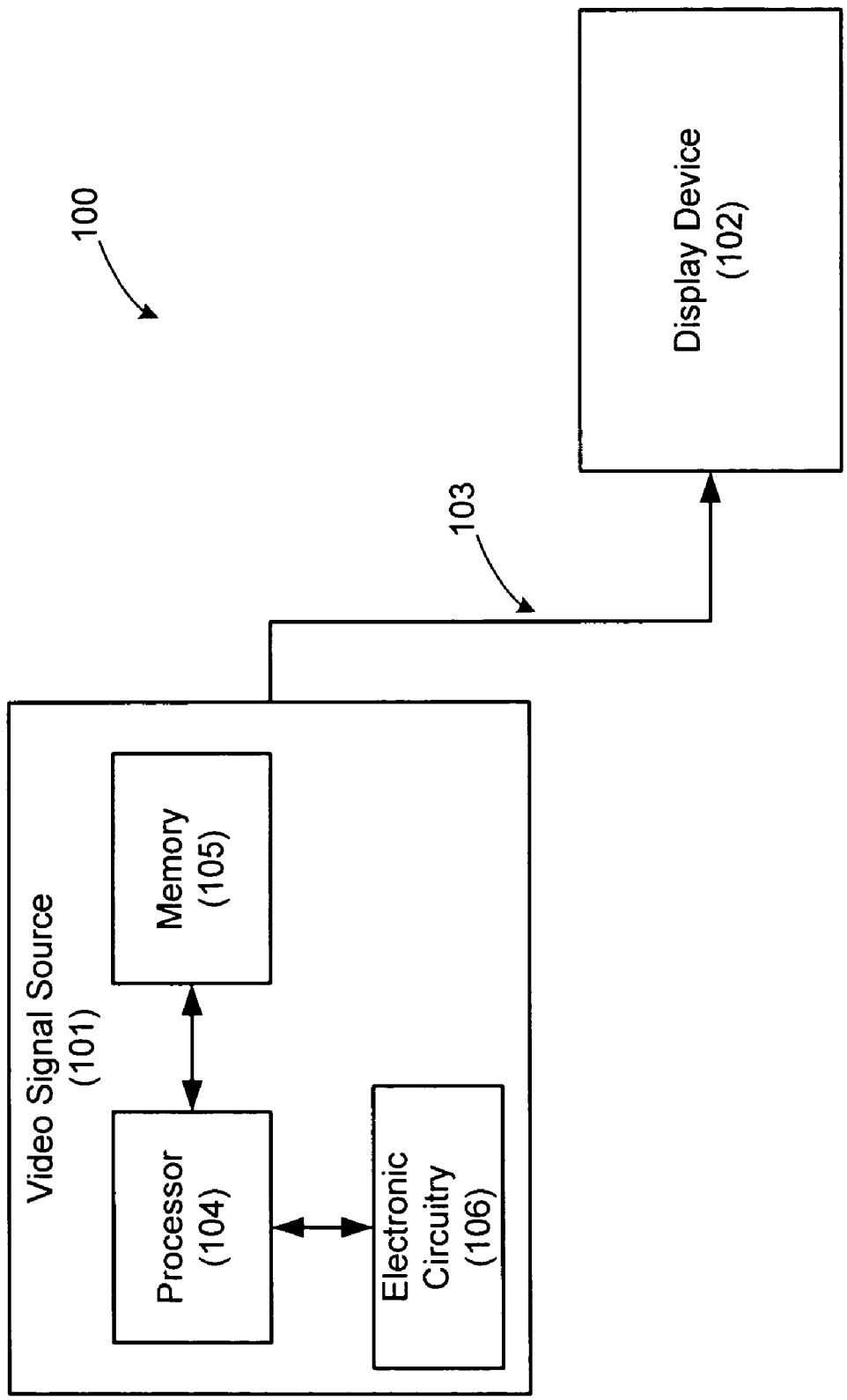
FIG. 1 illustrates an exemplary display system according to principles described herein.

FIG. 1 illustrates an exemplary display system (100). As shown in FIG. 1, the display system (100) includes a video signal source (101) coupled via a communication link (103) to a display device (102). The communication link (103) may be any suitable link such as a communication bus, wireless link, or the like.

The video signal source (101) may also be referred to as a host, and, as mentioned previously, may include a video card, a computer, a television, a projector system, or the like. In general, the video signal source (101) may include any combination of hardware, software, and firmware configured to generate a video signal and/or transmit the video signal to the display device (102). For example, the video signal source (101) illustrated in FIG. 1 includes a processor (104), memory (105), and other electronic components (106) that may be used to generate a video signal and transmit the video signal to the display device (102). The electronic components (106) may include circuitry configured to interface with the display device (102).

The video signal source (101) may be configured to generate and transmit a video signal to the display device (102)

according to any of a number of video transmission formats. For example, one format that is commonly used is known as Red, Green, Blue (RGB) format. In the RGB format, the color data or information of a video signal is encoded and sent to the display device (102) over three separate analog channels. A first channel corresponds to video data representing a red component of the image to be displayed. Likewise, a second channel corresponds to video data representing a green component of the image to be displayed and a third channel corresponds to video data representing a blue component of the image to be displayed.

Different levels of color are represented as different voltage levels on each of the three color channels in the RGB format. For example, the color white is encoded as full voltage on all three channels and the color black is encoded as no voltage on all three channels. Hence, the video signal may correspond to any possible color by sending appropriate voltage levels across the three different color channels. While many of the examples given herein will refer to the RGB format, it will be evident to one skilled in the art that the present systems and methods may be practiced independent of the video format. Moreover, it will be recognized that video signal generation and transmission formats other than the RGB format may be used.

Figure 2:
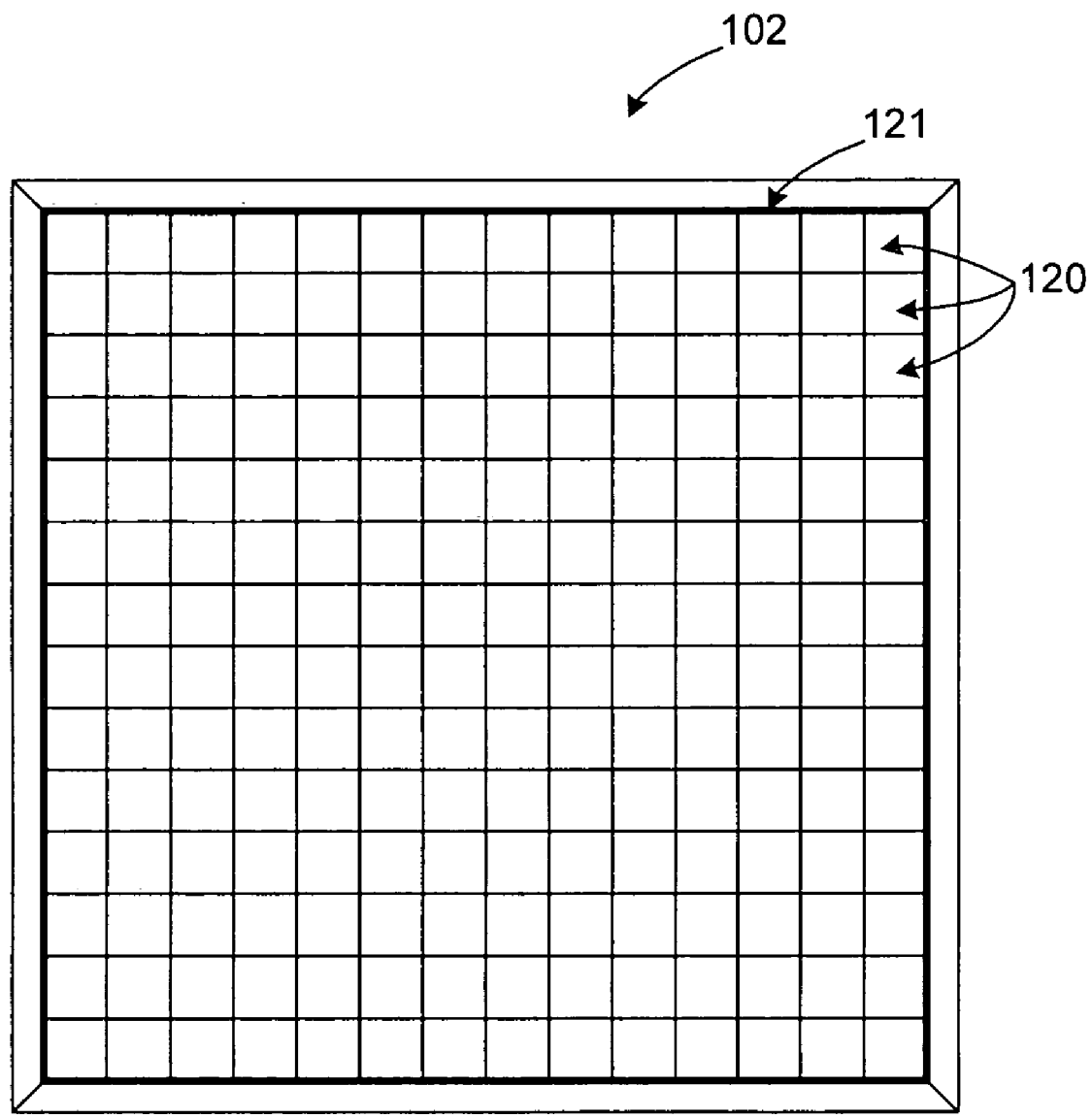
FIG. 2 illustrates the viewing area of an exemplary display device according to principles described herein.

The display device (102) of FIG. 1, as mentioned above, may include, but is not limited to, a computer monitor or screen, a television monitor or screen, a display device of a projector system, or any other type of digital display. FIG. 2 illustrates the viewing area (121) of an exemplary digital display device (102). As shown in FIG. 2, the viewing area (121) may be divided into discrete portions known as pixels (120). The pixels (120) are arranged in a number of horizontal rows. Each horizontal row is referred to as a line. The number of pixels (120) per line and the number of total lines in the viewing area (121) define the resolution of the display device (102). For example, a display device (102) with 768 lines each having 1024 pixels has a resolution of 1024×768. The ratio of pixels (120) per line to total number of lines in the viewing area (121) is referred to as the aspect ratio of the display device (102). For example, a display device (102) having a resolution of 1024×768 has an aspect ratio of 4:3. In some embodiments, the display device (102) is configured to be able to display a number of different resolutions and aspect ratios.

The video signal transmitted by the video signal source (101; FIG. 1) to the display device (102) includes image video data ("video data") corresponding to each pixel (120) to be displayed in the viewing area (121) of the display device (102). The video data may include, but is not limited to, color data representing the color of the different pixels (120), as described above. In some embodiments, the video data is arranged within the video signal on a line by line basis. In other words, the video data corresponding to a first line of pixels (120) is first sent to the display device (120) followed by the video data corresponding to a second line of pixels (120), etc. Once video data corresponding to all of the lines of pixels (120) of a particular image are sent to the display device (102), video data corresponding to the lines of a subsequent image to be displayed is sent to the display device (120) in a similar manner. The amount of time between the time when the display of the last line is finished and the display of the first line is begun again is known as the vertical refresh period.

The video signal transmitted by the video signal source (101; FIG. 1) to the display device (102) is often an analog signal. Hence, the digital display device (102) that receives an analog video signal, such as an RGB analog video signal, must convert the analog video signal to a digital video signal. The process of digitizing an analog video signal is often the source of many errors that degrade the color and/or resolution quality of the image produced by the display device (102).

In general, digitizing an analog signal involves sampling the analog signal at a constant rate. This constant rate is known as the sampling frequency. In many sampling schemes, the measured value at each sample time is assumed to be the value of the analog signal until the next sample is taken. In some examples, the display device (102) samples the video signal once for each pixel (120) in a line. Thus, if the display device (102) is configured to always display the same number of pixels per line, the sampling rate may be accurately determined by the display device (102).

However, in many instances, the number of pixels per line is not constant for each video signal that is input to the display device (102). In other words, a first video signal input to a display device (102) may have a first aspect ratio and a second video signal input to the display device (102) may have a second aspect ratio that is different than the first aspect ratio. For example, a display device (102) may be configured to display a first image with an aspect ratio of 4:3 and then a second image with an aspect ratio of 8:5. For each of these aspect ratios, for example, a display device (102) with 768 lines would display a different number of pixels per line. Thus, it may be difficult for the display device (102) to determine the correct sampling frequency when the number of pixels per line is not constant. Furthermore, it is also difficult for many display devices (102) to determine when to take the first sample of a video signal.

Therefore, without a constant aspect ratio or resolution, the digitization of an analog video signal may be prone to error. For example, the display device (102) may sample the video signal too frequently (over sample) or not frequently enough (under sample). Over sampling and/or under sampling of a video signal can result in distorted images.

Figure 3:
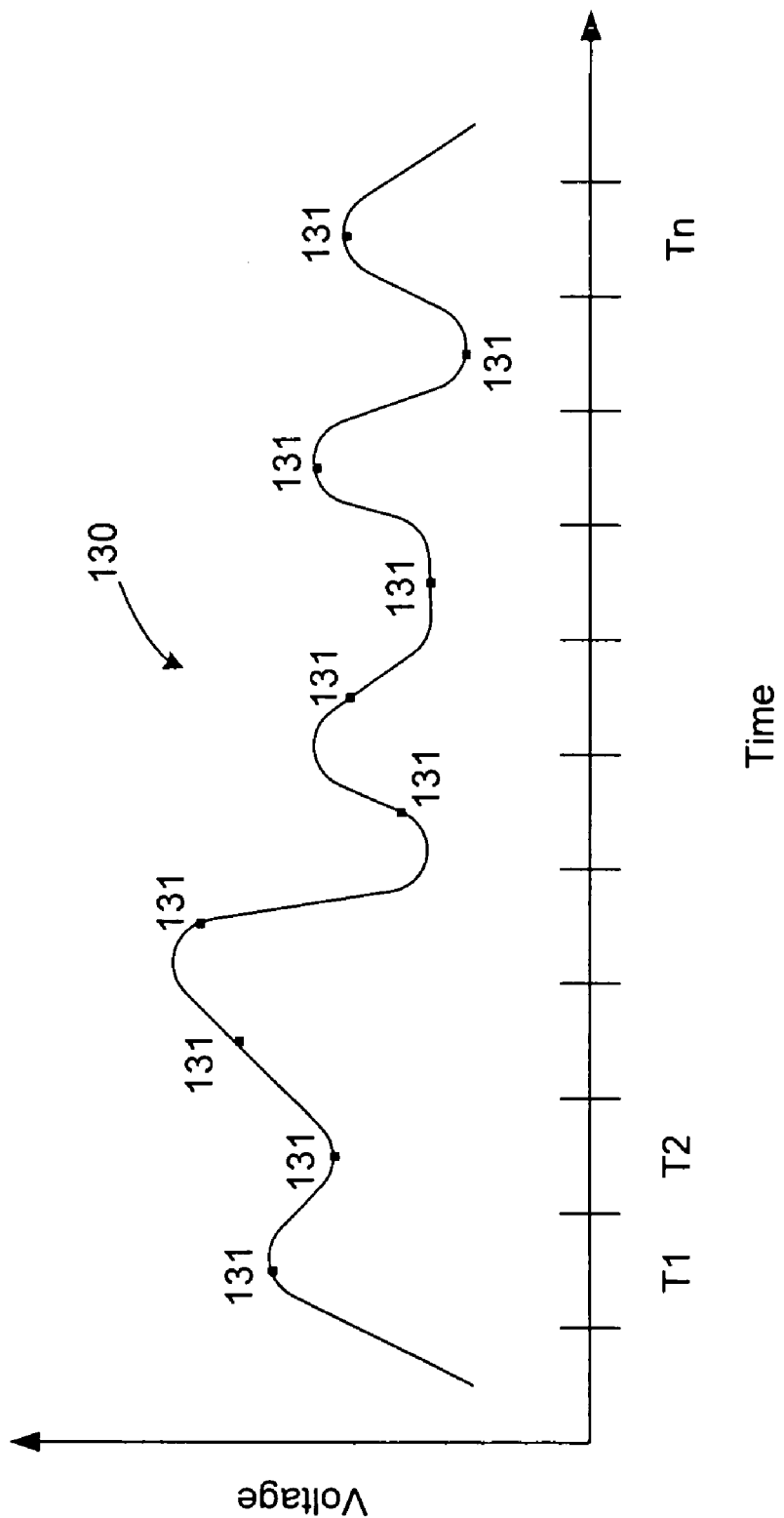
FIG. 3 illustrates an exemplary analog video signal that may be generated by the video signal source according to principles described herein.

Furthermore, although an analog video signal may be thought of as a series of discrete voltages corresponding to each pixel (120) to be displayed by the display device (102), the actual video signal is a continuous waveform of varying voltages. For example, FIG. 3 illustrates an exemplary analog video signal (130) that may be generated by the video signal source (101; FIG. 1). The analog video signal (130) shown in FIG. 3 is merely illustrative of the many different types of analog video signals that may be generated by the video signal source (101; FIG. 1) and transmitted across any number of channels (e.g., RGB channels). The analog video signal (103) may be divided into a number of time periods (T1, T2, . . . , Tn) wherein each time period (T1-Tn) corresponds to video data of a particular pixel (120).

The highest color quality of the image displayed by the display device (102) occurs when the display device (102) samples the video signal (130) at the midpoint or center of each time period (T1-Tn), as indicated by the sample points (131). Sampling at the midpoint of each time period (T1-Tn) is known as sampling in phase with the video signal (130). However, the closer the sampling is to the border between time periods (T1-Tn), the lesser the quality of the color of the image. In other words, if the display device (102) takes samples near the border of two time periods (T1-Tn), the colors of the corresponding pixels (120) may be blurred. Sampling near the edge of each time period (T1-Tn) is known as sampling out of phase.

In some embodiments, the video signal source (101; FIG. 1) is configured to include control data in the video signal that is transmitted to the display device (102; FIG. 1). The control data, as used herein and in the appended claims, unless otherwise specifically denoted, may include any data or information that specifies the resolution, phase, frequency, clock information, start time, stop time, codes to activate menu items (blanking, keystoning, etc.), and/or any other characteristic corresponding to the video signal and/or video data in the video signal. The control data allows the display device (102) to optimally process the video signal. For example, the resolution control data allows the display device (102) to determine an appropriate sampling frequency for the video signal. In addition, the start time, stop time, phase, and clock information corresponding to the video signal allow the display device (102) sample the video signal at appropriate times such that the color quality of the displayed image is optimal. For example, the control data may include a signal or a series of repeating bits having a phase equal to the phase of the video signal. The display device (102) may then relatively easily detect the phase of the signal or series of repeating bits and determine the phase of the video signal. As will be described in more detail below, the control data may be included in the video signal as a line of control data that has been encoded as video data.

Figure 4:
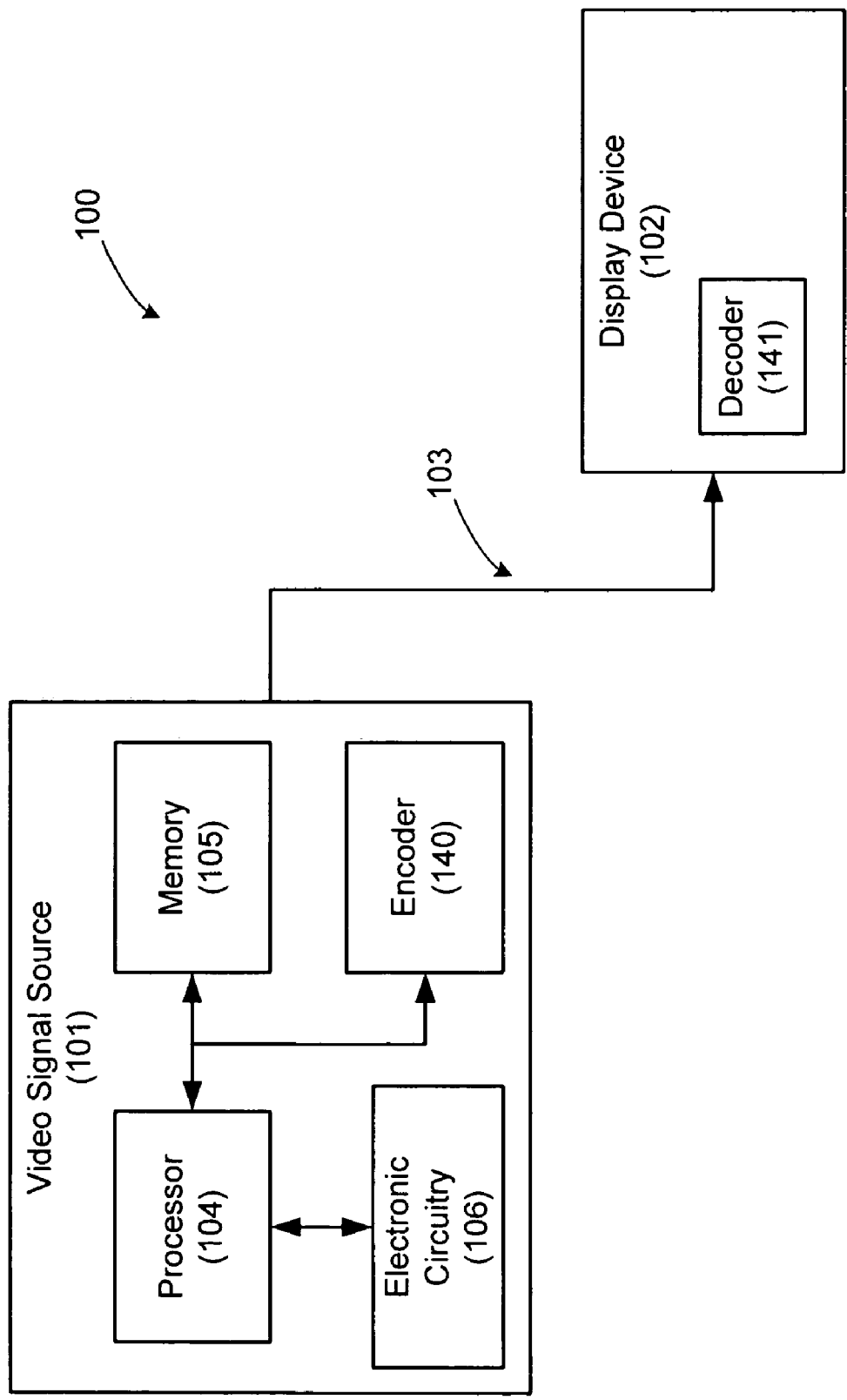
FIG. 4 shows an exemplary display system according to principles described herein.

FIG. 4 shows the display system (100) of FIG. 1 wherein the video signal source (101) is configured to include encoded control data in the video signal transmitted to the display device (102) and wherein the display device (102) is configured to decode and use the encoded control data to process the video signal. As shown in FIG. 4, the video signal source (101) includes an encoder (140) used to encode the control data and insert the encoded control data into the video signal. The encoder (140) may include any combination of hardware, software, and firmware. In some embodiments, the encoder (140) is a stand-alone component that communicates with the video signal source (101). In some alternative embodiments, the encoder (140) is integrated into the processor (104) or any other component of the video signal source (101) and includes a driver configured to insert the encoded control data into the video signal.

FIG. 4 also shows that the display device (102) may include a decoder (141) configured to decode the encoded control data. The decoder (141) may include any combination of hardware, software, and firmware configured to decode the encoded control data. The functions performed by the decoder (141) will be described in more detail below.

The control data may be included in the video signal by encoding the control data as a line of video data and then suppressing the display of that line of control data. Hence, as used herein and in the appended claims, any reference to "including control data in the video signal" and any similar phrases will refer to encoding the control data as a line of video data and including the encoded line of control data in the video signal. In some embodiments, the video signal source (101) includes the encoded control data as one or more additional lines of video data in the video signal. For example, if there are 768 lines of video data, a 769th line including the encoded control data may be transmitted to the display device (102). The additional lines of encoded control data may occur in a vertical retrace time of the display device (102) without changing the refresh rate of the display device (102).

Alternatively, the video signal source (101) may replace a line of video data with encoded control data. For example, if a particular line of pixels (120; FIG. 2) is to have a uniform color, the video data corresponding to that line in the video signal may be replaced with the encoded control data. For example, the image to be displayed by the display device (102) may be the Windows® desktop. The bottom line of pixels (120) on the Windows® desktop is typically a uniform gray. The video data corresponding to this bottom line of pixels (120) in the corresponding video signal may be replaced with the encoded control data. In another example, a large number of lines of pixels (120) may be a single color, such as black. In this example, it may be determined that a subsequent line of pixels (120) is likely to be of the same color. The video data corresponding to this subsequent line of pixels (120) in the corresponding video signal may be replaced with the encoded control data.

In some embodiments, any amount of video data in a line of video data may be replaced with a corresponding amount of encoded control data. The encoded control data may be inserted into the video signal on a regular periodic basis. Alternatively, the encoded control data is inserted into the video signal when the control data changes or when otherwise deemed necessary by the video signal source (101). If the video signal is transmitted using a format such as the RGB format, the encoded control data may be inserted into one or more of the color channels.

Figure 5:
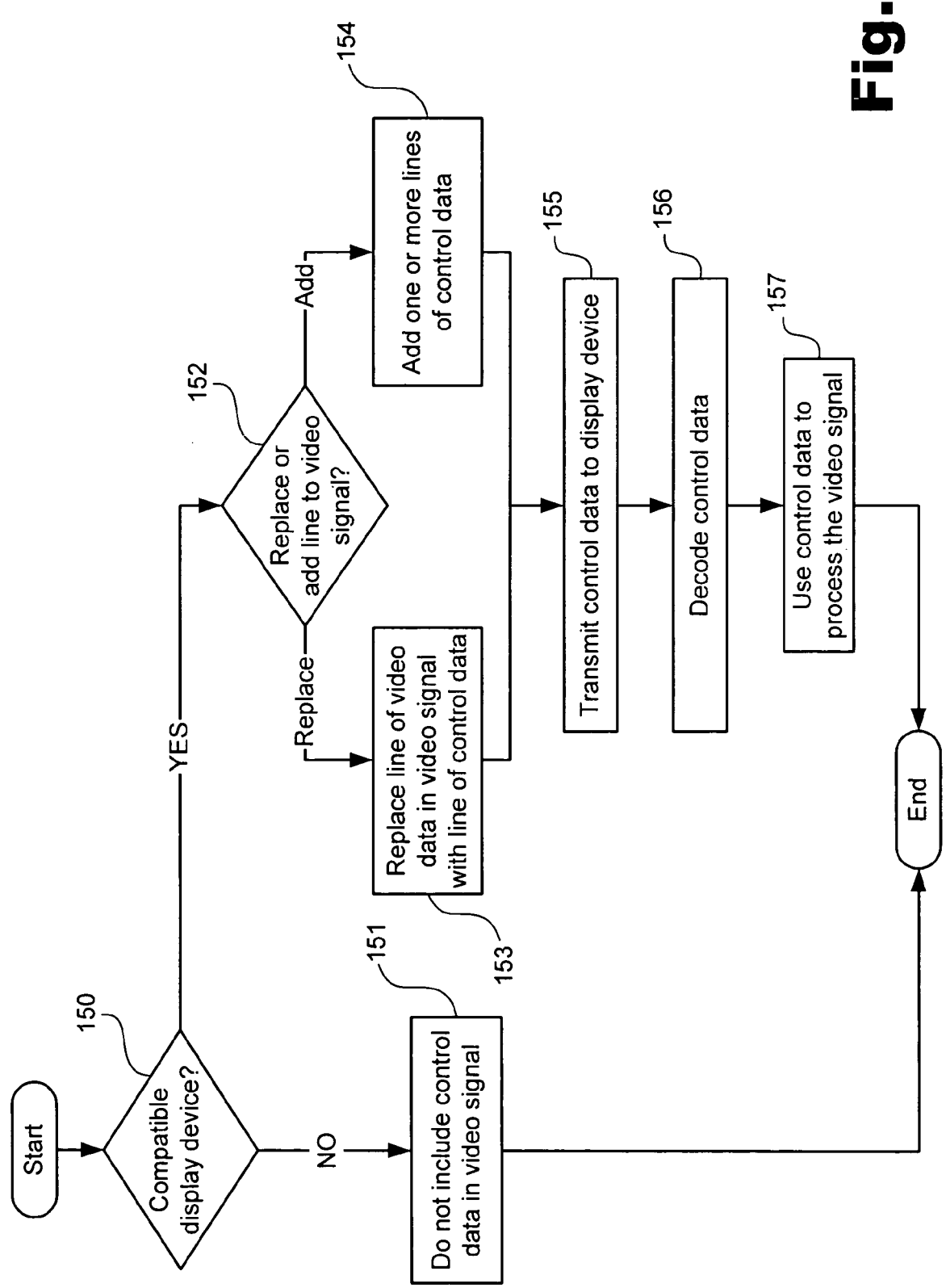
FIG. 5 is a flow chart illustrating an exemplary method of transmitting control data to a display device according to principles described herein.

FIG. 5 is a flow chart illustrating an exemplary method of transmitting control data to a display device (102; FIG. 4). As shown in FIG. 5, the video signal source (10; FIG. 4) first determines whether the display device (102; FIG. 4) is configured to decode encoded control data and use the control data to process a video signal (step 150). If the display device (102; FIG. 4) is not configured to accept control data (No; step 150), control data is not included in the video signal (step 151).

However, if the display device (102; FIG. 4) is configured to decode and use the control data (Yes; step 150), control data may be included in the video signal. The video signal source then determines whether to replace one or more lines of video data with the control data or to add one or more lines of control data to the video signal (step 152). If it is determined that one or more lines of video data will be replaced with control data (Replace; Step 152), the video signal source (101; FIG. 4) replaces one or more lines of video data with one or more lines of encoded control data (step 153). However, if it is determined to instead add one or more lines of control data to the video signal (Add; Step 152), the video signal source (101; FIG. 4) adds one or more lines of encoded control data to the video signal (step 154).

The encoded control data may then be transmitted to the display device (102; FIG. 4) (step 155). In some embodiments, the display device (102; FIG. 4) depends on the video signal source (102; FIG. 4) to have marked the line or lines of encoded control data as including control data. Alternatively, the display device (102; FIG. 4) may be configured to anticipate that every Nth line sent by the video signal source (101; FIG. 4) includes control data, where N stands for some positive integer.

Once the encoded control data has been transmitted to the display device (102; FIG. 4) (step 155), the display device (155) decodes the encoded control data (step 155). The display device (102; FIG. 4) may then use the control data to process the video signal (step 157). As mentioned, the display device (102; FIG. 4) is configured to suppress the display of the lines containing control data.

In some embodiments, the display device (102; FIG. 4) is configured to reproduce video data that has been replaced by encoded control data. For example, if a line video data corresponding to a number of uniformly colored pixels is replaced by a line of control data, data corresponding to the color may be included once in the line of control data and the display device (102; FIG. 4) may reproduce the color as many times as needed to fill the pixels corresponding to replaced video data. In yet another example, data representing commonly colored pixels, such as black pixels, may be stored in the display device (102; FIG. 4) and used to apply an appropriate color to pixels corresponding to replaced video data.

By including one or more lines of control data in the video signal, the display device (102; FIG. 4) may obtain the correct timing, frequency, phase, and other characteristics of the video signal regardless of the video signal content. Moreover, the present methods and systems may be used to transmit the control information without using additional connectors and without having to send signals other than the video signal.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A method of using control data to control a display of an image by a display device, said method comprising:
    encoding said control data as a line of video data;
    including said line of encoded control data in a video signal having a number of lines of image video data, wherein said line of encoded control data replaces a line of video data to be displayed in said video signal;
    transmitting said video signal to said display device; and
    using said control data to process said video signal and display said image; wherein said line of video data replaced by said line of encoded control data is extrapolated by context from said video signal and displayed in said image.

2. The method of claim 1, further comprising suppressing a display of said line of encoded control data.

3. The method of claim 1, wherein said control data comprises at least one or more of a frequency of said video signal, a phase of said video signal, a start time of said video signal, a stop time of said video signal, a code corresponding to said image, and a resolution of said image.

4. The method of claim 1, further comprising using said control data to determine a sampling frequency for said video signal.

5. The method of claim 1, further comprising using said control data to locate a position of one of said lines of said image video data in said video signal.

6. The method of claim 1, further comprising using said control data to determine a resolution of said image corresponding to said image video data.

7. The method of claim 1, wherein said step of encoding said control data comprises encoding said control data as multiple lines of video data that replace multiple lines of video data to be displayed in said video signal.

8. The method of claim 1, further comprising decoding said encoded control data.

9. A method of providing control data to a display device, said method comprising:
    encoding said control data as a line of video data;
    including said line of encoded control data in a video signal having a number of lines of image video data, wherein said line of encoded control data replaces a line of video data to be displayed in said video signal; and
    transmitting said video signal to said display device;
    wherein said display device uses said control data to process said video signal and display an image corresponding to said image video data; and
    wherein said display device extrapolates said line of video data replaced by said line of encoded control data by context from said video signal and displays said extrapolated line of video data in said image.

10. The method of claim 9, wherein said control data comprises at least one or more of a frequency of said video signal, a phase of said video signal, a start time of said video signal, a stop time of said video signal, a code corresponding to said image, and a resolution of said image.

11. The method of claim 9, wherein said step of encoding said control data comprises encoding said control data as multiple lines of video data that replace multiple lines of video data to be displayed in said video signal.

12. A method of displaying an image defined by image video data, said method comprising:
    receiving a video signal in a display device, said video signal comprising a number of lines of said image video data for display on said display device; wherein at least one of said lines for display comprises control data encoded as video data;
    decoding said encoded control data; and
    using said control data to process said video signal and display said image defined by said image video data; wherein said at least one line comprising control data in said video signal is replaced with a line extrapolated by context from said video signal in said display device and displayed in said image.

13. The method of claim 12, further comprising suppressing a display of said line of encoded control data.

14. The method of claim 12, wherein said control data comprises at least one or more of a frequency of said video signal, a phase of said video signal, a start time of said video signal, a stop time of said video signal, a code corresponding to said image, and a resolution of said image.

15. The method of claim 12, further comprising using said control data to determine a sampling frequency for said video signal.

16. The method of claim 12, further comprising using said control data to locate a position of one of said lines of said image video data in said video signal.

17. The method of claim 12, further comprising using said control data to determine a resolution of said image corresponding to said image video data.

18. A system for displaying an image defined by image video data, said system comprising:
    a video signal source configured to generate and transmit a video signal, said video signal comprising a number of lines of said image video data and a line of control data encoded as video data, wherein said line of encoded control data replaces a line of video data to be displayed in said video signal; and
    a display device coupled to said video signal source, said display device configured to receive said video signal and use said control data to process said video signal and display said image defined by said image video data; wherein said line of video data replaced by said line of encoded control data is extrapolated by context from said video signal and displayed in said image.

19. The system of claim 18, wherein said display device is further configured to suppress a display of said line of encoded control data.

20. The system of claim 18, wherein said control data comprises at least one or more of a frequency of said video signal, a phase of said video signal, a start time of said video signal, a stop time of said video signal, a code corresponding to said image, and a resolution of said image.

21. The system of claim 18, wherein said display device is further configured to use said control data to determine a sampling frequency and sample said video signal with said sampling frequency.

22. The system of claim 18, wherein said display device is further configured to use said control data to locate a position of one of said lines of said image video data in said video signal.

23. The system of claim 18, wherein said display device is further configured to use said control data to determine a resolution of said image corresponding to said image video data.

24. The system of claim 18, wherein said video signal source encodes said control data as multiple lines of video data that replace multiple lines of video data to be displayed in said video signal.

25. The system of claim 18, wherein said display device comprises a decoder configured to decode said encoded control data.

26. The system of claim 18, wherein said video signal source comprises at least one or more of a video card, a computer, a television, and a projector system.

27. The system of claim 18, wherein said display device comprises at least one or more of a computer monitor, a television monitor, a liquid crystal display, and a display device of a projector system.

28. The system of claim 18, wherein said video signal comprises an analog video signal.

29. A system for using control data to control a display of an image by a display device, said system comprising:
   means for encoding said control data as a line of video data;
   means for including said line of encoded control data in a video signal having a number of lines of image video data, wherein said line of encoded control data replaces a line of video data to be displayed in said video signal;
   means for transmitting said video signal to said display device; and
   means for using said control data to process said video signal and display said image; wherein said line of video data replaced by said line of encoded control data is extrapolated by context from said video signal and displayed in said image.

30. The system of claim 29, further comprising:
   means for suppressing a display of said line of encoded control data.

31. A system for transmitting control data to a display device, said system comprising:
   means for encoding said control data as a line of video data;
   means for including said line of encoded control data in a video signal having a number of lines of image video data, wherein said line of encoded control data replaces a line of video data to be displayed in said video signal; and
   means for transmitting said video signal to said display device;
   wherein said display device uses said control data to process said video signal and display an image corresponding to said image video data; said line of video data replaced by said line of encoded control data being extrapolated by context from said video signal and displayed in said image.

32. A system for displaying an image defined by image video data, said system comprising:
   means for receiving a video signal, said video signal comprising a number of lines of said image video data and a line of control data encoded as video data, wherein said line of encoded control data replaces a line of video data to be displayed in said video signal;
   means for decoding said encoded control data; and
   means for using said control data to process said video signal and display said image defined by said image video data; wherein said line of video data replaced by said line of encoded control data is extrapolated by context from said video signal and displayed in said image.

33. The system of claim 32, further comprising means for suppressing a display of said line of encoded control data.

* * * * *